United States Patent [19]

Ramaswamy

[11] Patent Number: 4,784,696

[45] Date of Patent: * Nov. 15, 1988

[54] PROCESS FOR PRODUCTION OF CONCENTRATED SALT STABLE AND BEER STABLE AMMONIA CARAMEL COLOR UNDER SUPERATMOSPHERIC PRESSURE CONDITIONS

[75] Inventor: Setlur R. Ramaswamy, Louisville, Ky.

[73] Assignee: D. D. Williamson & Co., Inc., Louisville, Ky.

[ * ] Notice: The portion of the term of this patent subsequent to Sep. 30, 2003 has been disclaimed.

[21] Appl. No.: 796,846

[22] Filed: Nov. 12, 1985

Related U.S. Application Data

[63] Continuation-in-part of Ser. No. 769,845, Aug. 26, 1985, abandoned.

[51] Int. Cl.$^4$ .................................................. C13F 3/00
[52] U.S. Cl. ............................... 127/34; 127/DIG. 1; 426/540; 426/658; 426/442; 426/250
[58] Field of Search ........................... 127/34, DIG. 1; 426/540, 442, 250, 474, 658

[56] References Cited

U.S. PATENT DOCUMENTS

| | | | |
|---|---|---|---|
| 2,582,261 | 1/1952 | Longenecker | 127/34 |
| 2,767,108 | 10/1956 | Fetzer | 127/34 |
| 2,784,118 | 3/1957 | Pyle | 127/34 |
| 3,214,294 | 10/1965 | Meisel | 127/34 |
| 3,385,733 | 5/1968 | Ackermann | 127/34 |
| 3,618,588 | 11/1971 | Anwar et al. | 127/34 |
| 4,138,271 | 2/1979 | Ohira et al. | 127/34 |
| 4,614,662 | 9/1986 | Ramaswamy | 426/658 |

FOREIGN PATENT DOCUMENTS

| | | |
|---|---|---|
| 920224 | 4/1947 | France . |
| 920225 | 4/1947 | France . |
| 2071241 | 9/1971 | France . |
| 696736 | 9/1953 | United Kingdom . |

*Primary Examiner*—H. M. S. Sneed
*Assistant Examiner*—Chung K. Pak
*Attorney, Agent, or Firm*—Wood, Herron & Evans

[57] ABSTRACT

Ammonia caramel color is formed in a fast cook method under elevated pressure and temperature by reacting ammonia catalyst with a carbohydrate syrup wherein the amount of water in the ammonia carbohydrate syrup mixture is controlled. The water content is maintained at preferably less than 40% of the mixture during a substantial portion of the caramelization reaction. Preferably the ammonia caramel is formed by reacting a carbohydrate syrup having a solids content of at least 75-80% with an anhydrous ammonia catalyst and reacting this at elevated temperature and super-atmospheric pressure over a period of 1-2 hours. Although the caramelization reaction generates water, the water content will not exceed 40%. This facilitates the rapid formation of caramel color without increasing the 4MeI or THI content, and without hazing of the caramel color. Further this produces a remarkably salt stable product.

8 Claims, No Drawings

PROCESS FOR PRODUCTION OF CONCENTRATED SALT STABLE AND BEER STABLE AMMONIA CARAMEL COLOR UNDER SUPERATMOSPHERIC PRESSURE CONDITIONS

RELATED APPLICATIONS

This is a continuation in part of U.S. patent application Ser. No. 769,845, filed Aug. 26, 1985, also assigned to D. D. Williamson & Co., Inc., now abandoned.

BACKGROUND OF THE INVENTION

Caramel color is a product of the heat treatment of carbohydrates, typically sugars, usually in the presence of a catalyst. There are several types of caramel colors, for example, non-acid resistant and acid resistant types. The different types of caramel colors are chosen for their suitability for a particular end use. With soft drinks, acid-resistant type caramel colors are required. Malt beverages such as beer require non-acid resistant caramel color. Non-acid resistant caramel color particularly suitable for malt beverages is produced using an aqueous ammonia or anhydrous ammonia catalyst. This is referred to as ammonia caramel color.

Ammonia caramel color is generally produced using a batch type process. In a batch type process a large kettle containing up to 2000 gallons or more of a carbohydrate syrup such as corn syrup is heated to boiling for about 8 to 12 hours at atmospheric pressure. Gradually the ammonia catalyst is added and the color forms. This is then slowly cooled and filtered and brought to the desired concentration.

Current batch processes are very slow usually requiring 8–12 hours or more. Increasing the temperature of the batch reaction will increase the rate, however increased pressure is required. When producing ammonia caramel color the increased pressure causes hazing of the caramel and eliminates beer stability thereby providing an unacceptable caramel color. Beer stability refers to the tendency of the caramel color to remain dissolved in beer and not cause the beer to become murky.

Another problem with caramel color is the production of 4-methyl imidazole (hereafter 4MeI) and 2-acetyl-4(5)-tetrahydroxy butyl imidazole (hereinafter THI). Over the past several years the Food and Drug Administration has limited the content of 4MeI in caramel color and may soon limit the THI content. It is believed that 4MeI and THI are reaction products of the carbohydrate in combination with the ammonia catalyst. To control the production of 4MeI and THI the ammonia catalyst must be added to the batch reactor very slowly. This is particularly difficult to control accurately; and even with this slow addition of the ammonia catalyst, unacceptably high levels of 4MeI and THI are sometimes encountered. Such high levels can require discarding of an entire batch of caramel color. THI and 4MeI content is even more of a problem with a darker caramel color is desired. The darker color is produced by more severe reaction condition which tend to increase THI and 4MeI.

Salt stability is also a concern with caramel color which is added to certain food products. Salt stable caramel color does not precipitate or turn turbid when added to a concentrated salt solution. Dark caramel color is rarely salt stable.

Although apparently never commercially developed, methods have been disclosed to produce caramel color under high pressure. For example, Meisel U.S. Pat. No. 3,214,294 and Ackermann U.S. Pat. No. 3,385,733 disclose continuous high pressure methods of producing caramel colorings. The Ackermann reference teaches forming a mixture of catalyst and carbohydrate syrup preferably corn syrup, preheating this to a temperature of 350° F. to 1,000° F., maintaining this reaction mixture in a continuous reactor under pressure for a period of 5 to 300 minutes. Various catalysts including phosphoric and sulfuric acids and ammonium, potassium or sodium hydroxide are disclosed. Meisel also discloses using ammonium bisulfite as a catalyst.

Ammonia caramel produced according to the teachings of Meisel or Ackermann would have excessively high 4MeI and THI contents and further hazing would occur causing an unacceptably cloudy product.

SUMMARY OF THE INVENTION

The present invention is premised on the realization that salt stable ammonia caramel with low 4MeI and THI contents can be formed by caramelizing a carbohydrate syrup and ammonia mixture wherein the amount of water in the mixture of syrup and ammonia is maintained at a relatively low level during at least a portion of the caramelization reaction.

Further, the present invention is premised on the realization that ammonia caramel color can be formed in one fourth to one half the time normally required to produce ammonia caramel by maintaining this low water concentration and caramelizing the syrup at high temperatures and pressures. Further according to the present invention, ammonia caramel can be produced which is very dark, salt stable with low 4MeI and THI levels and without hazing even though reaction is conducted under pressure at high temperatures. Further, the salt and beer stability as well as the 4MeI and THI contents are improved by preheating the syrup to at least about 230° F. prior to addition of catalyst.

Preferably this high quality caramel color is produced by preheating a carbohydrate syrup having a solids content of at least about 75 and preferably 80% and reacting the preheated syrup with anhydrous ammonia at elevated temperatures and pressures. Generally the reaction temperature should be in the range of 250°–330° F. for a period of 1–6 hours and at pressures varying from about 20 psi to about 100 psi. The caramelization reaction produces water. The reactants are therefore controlled so that the water content of the reaction mixture is less than 40% throughout the reaction.

Alternately the caramelization reaction can be started with more than 25% water and the reaction conducted at elevated pressure. However, water is vented off as steam during the reaction and before 60% of the final color is formed. The water can be vented off while the reaction is "stopped" when the pressure and temperature are substantially reduced or can be vented off gradually. In this manner the water content is reduced to less than about 40% of the reaction mixture before 60% of the final color is formed.

An important feature of the present invention is that it can be practiced in currently used batch equipment or can be practiced in a continuous process.

These and other advantages of the present invention will be appreciated in light of the following detailed description.

DETAILED DESCRIPTION

Caramel color is produced by reacting a carbohydrate syrup and an ammonia catalyst at elevated pressure and temperature. According to the present inventin the amount of water present during the reaction time is strictly controlled. By controlling the water content, hazing of the product is prevented and 4MeI and THI content are minimized. The controlled quantity of water can be attained by either controlling the amount of water in the syrup and catalyst mixture which is reacted or by starting with higher amounts of water in the reaction mixture and venting off some of this water during the reaction to establish the quantity of water at the desired level in the reaction mixture.

In the first method the selection of an appropriate syrup and catalyst are extremely important. The carbohydrate syrup can be a hydrolysate of corn starch, for example corn syrup, sucrose, dextrose, invert sugar, molasses or malt syrup. These syrups are a mixture of water and dissolved or partially dissolved carbohydrates. Normally food grade corn syrup is used.

For use in the present invention the syrup must have a high concentration of solids. Generally the solids content of the syrup will be at least about 75% and preferably 80-95%. Carbohydrate syrups are generally defined in terms of dextrose equivalents. The dextrose equivalent of the syrups should be from about 75 D.E. to about 80-95 D.E.

The catalyst for use in the present invention is preferably anhydrous ammonia. The anhydrous ammonia can be used as either a gas or as a liquid. The ratio of ammonia to syrup solids should be 1/10 to about 1/150 depending on the desired color formation. Preferably, the amount of ammonia relative to the solids content of the syrup by weight should be in the range of 10-50 parts syrup solids to one part ammonia by weight. More preferably, this ratio will be in the range of 1/10-1/20. The ammonia and carbohydrate syrup are combined and reacted at elevated temperature and pressure.

The caramelization reaction is conducted in a jacketed autoclave with a stirrer and ammonia injection port. Preferably the ammonia injection port provides for addition of the ammonia at the bottom of the reaction vessel.

The syrup is added to the reactor, the reactor sealed and the temperature of the syrup raised to an effective temperature and pressure and for an effective amount of time to provide a desired degree of caramelization and color formation. The ammonia catalyst is gradually added to the heated carbohydrate syrup.

The reaction temperature determines the rate of reaction. Although the reaction can occur at a temperature as low as 230° F. and at atmospheric pressure, it is preferred that the reaction temperature be established at at least about 250° F. to about 330° F., preferably 250° F. to 270° F. The temperature is established by injecting steam through the jacket of the reactor. Other means such as electrical resistance heating can also be used.

Since the reaction is conducted in a sealed autoclave the pressure rises autogeniously. The pressure is dependent upon the temperature. Preferably the pressure will be at about 15-100 psi. Generally at temperatures of about 250° F. to 270° F. the pressure will rise to about 15-35 psi. At temperatures higher than 330° F. and pressures greater than 100 psi the reaction occurs too quickly and the risk of burning the syrup is excessive.

The ammonia is added at a rate such that with the syrup being stirred the pH of the syrup does not exceed 7 and more preferably never exceeds 6.5. This pH level is determinative of the rate of addition of the ammonia. The ammonia is added gradually at the initial portion of the reaction. The higher the temperature and pressure, the faster the reaction occurs. Therefore ammonia can be added more quickly, When the reaction temperature is at about 250°-270° F. the ammonia is generally added over a period of about 60 to about 90 minutes. In terms of amounts of ammonia per syrup solids, ammonia is added to the syrup in an amount equal to 1% to 10% (by weight) of syrup solids per hour (preferably 5% to 8% per hour).

Overall reaction time will vary depending on the reaction temperature and pressure and the final desired color formation or development. The final color development or formation is at least about 0.1 absorbance at 610 nm at 0.1% w/v through a 10 mm cell. Preferably the color formation will be in the neighborhood of 0.15-2.0 absorbance at 610 nm and 0.1% w/v (i.e., 1 g. syrup per 1000 cc water) through a 10 mm cell. More generally the color content will be in the range of 0.17-0.18 abs at 610 nm and 0.1% w/v. To form caramel color with this degree of color formation at 250° F. to 330° F. the reaction time will vary from 10 minutes to about six hours from the time ammonia is first added. Preferably at 250°-270° F. the reaction will be conducted in about 90 to about 120 minutes with the ammonia added in the first 0 to 60 to 90 minutes.

This method of practicing the present invention will be further understood in light of the following examples.

EXAMPLE 1

100 pounds of 95 D.E. (77% solids) corn syrup was reacted with 5.0 pounds of liquid anhydrous ammonia in a stirred, heated autoclave. The syrup in the sealed autoclave was preheated to 250° F. and the ammonia gradually added to the reaction mixture over a period of one hour. At the end of one hour the reaction vessel was cooled, opened and vented and heated to 210° F. to drive off moisture to control the specific gravity. After the specific gravity was established at about 1.3, the reactor was closed and again heated until the present transmittance of the reacting mixture reached the desired level. The reaction took 125 minutes. The temperature, pressure and pH are provided in Table 1 during the course of the reaction along with the percent transmittance and specific gravity listed towards the latter part of the reaction. The finished product has a viscosity of 2950 centipoise at 20° C., a 4MeI content of 96 ppm, a percent transmittance of 23.25 with a pH of 4.88 and a specific gravity of 1.32. The absorption at 610, 560 and 510 nm was 0.355, 0.647, and 1.205, (at 0.2% w/v) respectively providing a hue index of 5.3. This provided a beer and salt stable, ammonia caramel solution.

TABLE 1

| Time (Min) | Temp | psi | % T | pH | S/G |
|---|---|---|---|---|---|
| 0 | 250° F. | — | — | — | — |
| 15 | 260° F. | 30 | — | 6.75 | — |
| 30 | 265° F. | 35 | — | 6.15 | — |
| 45 | 262° F. | 28 | — | 5.08 | — |
| 60 | 258° F. | 28 | — | 5.40 | — |
| 65 | Cool | open vent, open head heat to 210° F. | | | |
| 75 | 212° F. | — | 37.75 | 5.20 | 1.283 |
| 105 | 220° F. | — | 31.50 | — | 1.313 |
| 110 | close lid and close vent | | | | |

TABLE 1-continued

| Time (Min) | Temp | psi | % T | pH | S/G |
|---|---|---|---|---|---|
| 120 | 252° F. | 15 | 25.25 | | 1.319 |
| 130 | cool | | | | |

% T represents percent transmittance and S/G represents specific gravity.

EXAMPLE 2

100 pounds of corn syrup having a D.E. of 95 and 77% solids was reacted with 5.5 pounds of anhydrous liquid ammonia in a stirred, heated autoclave. The syrup in the sealed autoclave was preheated to 250° F. and the ammonia added during the first 90 minutes of the reaction. The reaction time and conditions are listed in Table 2. The product had a color (at 0.2% w/v) of 0.358 at 610 nm, 0.663 at 560 nm and 1.251 at 510 nm giving a hue index of 5.43. The final product had a pH of 4.98, percent transmittance of 21.75, specific gravity of 1.275 and a 4MeI content of 80 ppm.

TABLE 2

| Time (Min) | Temp | psi | pH | % T | S/G |
|---|---|---|---|---|---|
| 0 min. | 250° F. | — | — | — | — |
| 15 | 263° F. | 23 | 5.39 | — | — |
| 30 | 257° F. | 26 | 5.20 | — | — |
| 45 | 255° F. | 28 | 5.30 | — | — |
| 60 | 253° F. | 28 | 5.63 | — | — |
| 75 | 261° F. | 33 | 5.30 | — | — |
| 93 | 252° F. | 23 | 5.30 | 26.0 | 1.268 |
| 96 | cool to 200° F. open lid | | | | |
| 123 | 213° F. | — | 5.11 | 25.5 | 1.262 |
| 153 | 215° F. | — | 5.01 | 24.5 | 1.264 |
| 183 | 220° F. | — | 5.00 | 23 | 1.271 |
| 213 | cool | | | | |

EXAMPLE 3

100 pounds of corn syrup having a D.E. of 80 with 81% solids was reacted with 5.5 pounds of anhydrous liquid ammonia in a stirred, heated autoclave. The syrup was preheated in the sealed autoclave to 250° F. and the liquid ammonia added gradually over a period of one hour from start. The reaction time, temperature, pressure, pH, percent transmittance and specific gravity of the reaction mixture are listed in Table 3. The final product was a caramel color having a pH of 4.73, specific gravity of 1.330, a color (at 0.2% w/v) of 0.366 at 610 nm, 0.661 at 560 nm and 1.219 at 510 nm with a hue index of 5.22. The 4MeI content was 101 and the viscosity was 6,450 centipoise at 20° C. The product was beer and salt stable.

TABLE 3

| Time (Min) | Temp | pH | psi | % T | S/G |
|---|---|---|---|---|---|
| 0 | 250° F. | — | — | — | — |
| 30 | 255° F. | 5.71 | 35 | 57 | — |
| 70 | 250° F. | 6.01 | 18 | 40.50 | 1.315 |
| 90 | 249° F. | 5.18 | 13 | 34.00 | 1.303 |
| 120 | 255° F. | — | 18 | 27.00 | 1.316 |
| 140 | 255° F. | — | 17 | 22.00 | 1.322 |
| 143 | cool | | | | |

EXAMPLE 4

One hundred (100) pounds of corn syrup was reacted with 5.50 pounds of anhydrous liquid ammonia. The syrup had a D.E. of 80 and a percent solids of 81%. The syrup was preheated in a selaed autoclave to 250° F. and the ammonia added over a period of 55 minutes. As shown in Table 4 the reaction temperature was varied from 240° F. to 264° F. and the pressure from 32 psi to 17 psi. The final product had a percent transmittance of 19.25. This was combined with 3,500 cc of water to produce a product having a percent transmittance of 23.00, a specific gravity of 1.328, a pH of 5.04. The color (at 0.2% w/v) was 0.359 at 610 nm, 0.646 at 560 nm and 1.183 at 510 nm. The hue index therefore was 5.18. The 4MeI content was 109 ppm and the yield was 90 pounds of caramel syrup having a viscosity of 4,000 centipoise at 79° F.

TABLE 4

| Time (Min) | Temp | psi | pH | % T | S/G |
|---|---|---|---|---|---|
| 0 | 250° F. | — | — | — | — |
| 13 | 245° F. | 30 | 6.92 | — | — |
| 28 | 255° F. | 24 | 6.18 | — | — |
| 43 | 253° F. | 32 | 6.05 | — | — |
| 73 | 264° F. | 19 | 5.27 | 34.5 | 1.328 |
| 93 | 263° F. | 17 | — | 22.5 | 1.358 |
| 98 | cool | | | | |

EXAMPLE 5

100 pounds of corn syrup having a D.E. of 80 and 81% solids was reacted with 4.0 pounds of liquid anhydrous ammonia in a stirred, heated autoclave. The syrup in the sealed autoclave was preheated to 250° and the ammonia added during the first 60 minutes of the reaction. The reaction time and conditions are listed in Table 5. The produced caramel had a color (at 0.4% w/v) of 0.498 at 610 nm, 0.918 at 560 nm and 1.689 at 510 nm. This product has a pH of 4.40 and a percent transmittance of 12.75 with viscosity of 2,525 at 24° C. The 4MeI content was 16.

TABLE 5

| Time (Min) | Temp | psi | % T | pH | S/G |
|---|---|---|---|---|---|
| 0 | 250° F. | — | — | — | — |
| 15 | 255° F. | 25 | — | 5.22 | — |
| 30 | 260° F. | 38 | — | 5.25 | — |
| 45 | 260° F. | 35 | — | 4.88 | — |
| 60 | 255° F. | 36 | — | 4.98 | — |
| 65 | 255° F. | 20 | 17.25 | — | 1.323 |
| 73 | 245° F. | 12 | 14.75 | — | — |
| 80 | Cool | | | | |

EXAMPLE 6

100 pounds of corn syrup having a D.E. of 80 and a solids content of 81% was reacted with 5.5 pounds of liquid anhydrous ammonia in a stirred, heated autoclave. The syrup was preheated to 250° F. in a sealed autoclave and the ammonia added during the first 90 minutes of the reaction. The reaction time and conditions are listed in Table 6. The final product has a color (at 0.2% w/v) of 0.338 at 610 nm, 0.623 at 560 nm and 1.176 at 510 nm. The pH was 5.07, the specific gravity 1.312, viscosity 3300 at 26° C. and the 4MeI content was 47.

TABLE 6

| Time (Min) | Temp | psi | % T | pH | S/G |
|---|---|---|---|---|---|
| 0 | 250° F. | — | — | — | — |
| 15 | 253° F. | 27 | — | 5.75 | — |
| 30 | 261° F. | 26 | — | 4.60 | — |
| 45 | 264° F. | 47 | — | 5.30 | — |
| 60 | 260° F. | 56 | — | 5.15 | — |
| 75 | 250° F. | 53 | — | 5.21 | — |
| 90 | 252° F. | 55 | — | 5.97 | — |
| 95 | 253° F. | 18 | 33 | — | — |
| 110 | 253° F. | 17 | 29.5 | — | 1.303 |
| 125 | 255° F. | 19 | 26 | — | — |

TABLE 6-continued

| Time (Min) | Temp | psi | % T | pH | S/G |
|---|---|---|---|---|---|
| 135 | 255° F. | 16 | 24 | 5.25 | — |
| 141 | Cool | | | | |

EXAMPLE 7

100 pounds of corn syrup having a D.E. of 80 and a solids content of 81% was reacted with 2.6 pound of liquid anhydrous ammonia. The corn syrup was preheated to 250° F. in a sealed, stirred, heated autoclave and the ammonia added over a period of 60 minutes. The reaction times and conditions are listed in Table 7. The final product had a color (at 0.4% w/v) of 0.418 at 610 nm, 0.790 at 560 nm and 1.556 at 510 nm. The product's pH was 4.45, specific gravity 1.352, viscosity 2150 at 26° F. and 4MeI content of 42 ppm. Percent transmittance was 16.50.

TABLE 7

| Time (Min) | Temp | psi | pH | % T | S/G |
|---|---|---|---|---|---|
| 0 | 250° F. | | | | |
| 15 | 253° F. | 24 | 5.93 | — | — |
| 30 | 256° F. | 23 | 4.72 | — | — |
| 45 | 255° F. | 33 | 4.80 | — | — |
| 60 | 255° F. | 48 | 4.88 | — | — |
| 67 | 255° F. | 15 | — | 21.5 | 1.319 |
| 73 | 252° F. | 14 | 4.59 | 19.5 | — |
| 80 | Cool | | | | |

In Examples 1–7 the reaction was conducted by controlling the water content of the mixture of ammonia and sugar. Anhydrous ammonia was used in all of these examples therefore all water content was contributed by the syrup. The highest water content was 23%. The lowest water content of the starting reactant was 19%. When this occurs there is no reason that water has to be removed during the course of the reaction. Although water is generated during the reaction, the water content never exceeds 40% as determined by measuring specific gravity. In Examples 1 and 2 the reaction was stopped and steam vented in order to establish the desired specific gravity (i.e., water content at less than 40%). In Examples 3–7 the original water content was lower and there was no need to vent off any steam to control the specific gravity. In all of these examples, the water content was low enough from the beginning of the reaction to provide for a salt stable product.

Alternate Method

In an alternate method of providing such a product, the initial mixture of syrup and catalyst could have in excess of 25% water. For example if an aqueous ammonia catalyst solution was used, it would be approximately 71% water and would itself increase the water concentration of more than 25%. When the syrup catalyst mixture has in excess of 25% water the fast cook method can be employed provided that the water content of the syrup catalyst mixture including any generated during the carmelization reaction is reduced to less than 40% prior to development of about 60% of the final caramel color. In such a reaction the relative proportion of ammonia to sugar solids remains the same. The reaction time again can be conducted in 10-200 minutes and the reaction temperature can vary from approximately 230°-330° F. preferably in the range of 250° to 270° F.

If the final desired color absorption is going to be 0.18 at 610 nanometers, the reaction must be discontinued before the caramel develops a color of 0.108 at 610 nm. Excess water, i.e., that water in excess of 40% of the syrup catalyst mixture, must be vented off. To do this the reaction is stopped, the reaction vessel cooled, opened and reheated to boiling to drive off excess water. Alternately lower pressures or sub-atmospheric pressures can be used to remove water. Once the water concentration of the syrup catalyst solution is less than 40% and preferably less than 30% the reaction is resumed by closing the autoclave reaction vessel and reheating the contents thereof to the reaction temperature to effect further caramelization.

In this embodiment the invention is simply practiced by developing a large portion (at least 40%) of the color while the water content is controlled or established at less than 40% of the syrup ammonia mixture. This method will be further appreciated in light of the following example.

EXAMPLE 8

1200 gallons of corn syrup, 80 D.E., 81% solids, specific gravity 1.433 was reacted with 365 gallons (2935 pounds) of aqua ammonia (specific gravity 0.8996). Syrup was charged into an autoclave equipped with a heater and stirrer and the autoclave sealed. The syrup was preheated to 250° F. and the aqua ammonia was added for a period of 65 minutes. The heat was then discontinued and the reactor allowed to cool down to below 212° F. and the autoclave was opened. The syrup was then heated in the opened autoclave until sufficient water was removed to provide a reaction mixture having a specific gravity of 1.335. The autoclave was then sealed and the temperature again raised to the desired reaction temperature. The reaction time and conditions are listed in Table 8. The final product before adjustment had a percent transmittance of 22.00, a specific gravity of 1.345 and a pH of 4.88 after a cooking time of 6 hours. This was adjusted by adding 75 gallons of water to provide a product having a pH of 4.77, a specific gravity of 1.324 and a percent transmittance of 24.0%. The product had a color (at 0.2% w/v) of 0.345 at 610 nm, 0.629 at 560 nm and 1.162 at 510 nm providing a hue index of 5.27. 1,200 gallons of caramel color were produced having a 4MeI content of 108 and a THI content of 17 ppm.

TABLE 8

| Time (Min) | Temp | psi | pH | % T | S/G |
|---|---|---|---|---|---|
| 0 | 250° F. | | | | |
| 15 | 258° F. | 17 | 6.22 | — | — |
| 30 | 259° F. | 25 | 5.86 | — | — |
| 45 | 258° F. | 35 | 6.02 | — | — |
| 60 | 259° F. | 43 | 6.14 | — | — |
| 85 | 257° F. | 47 | Cool down; open lid, reheat | | |
| 120 | 213° F. | — | 5.68 | 45.¾ | 1.271 |
| 150 | 216° F. | — | 5.55 | 42.¾ | 1.287 |
| 185 | 217° F. | — | 5.42 | 38.¼ | 1.300 |
| 215 | 218° F. | — | 5.26 | 34.5 | 1.327 |
| 230 | 218° F. | — | 5.25 | 32 | 1.335 |
| 232 | 218° F. | — | Cool, close lid, steam back on, vent closed | | |
| 272 | 255° F. | 22 | 5.03 | 29 | 1.337 |
| 290 | 256° F. | 15 | 4.98 | 25.5 | 1.333 |
| 305 | 249° F. | 10 | 4.95 | 24 | 1.338 |
| 320 | 248° F. | 8 | 4.88 | 22.5 | 1.346 |
| 327 | 248° F. | 8 | Cool cooker down | | |

Except for Example 8, the THI content of the caramel color produced in the examples was not determined. However, it is believed that the THI content in each of these examples should be in the range of 5 to about 20. The THI content tends to relate to the 4MeI content. Therefore when a low 4MeI content is detected it is presumed that the THI content is also relatively low.

By following either of these specific methods of making caramel color the 4MeI content and THI content are both minimized. Further, the salt stability is greatly improved and hazing is not a problem. This is all accomplished while at the same time providing a lower cost, more rapid method of producing ammonia caramel. Thus the present invention produces a quick simple method of producing ammonia caramel.

The present invention can also be practiced in a continuous reactor. Further, the reaction may also be conducted by preheating the catalyst prior to adding it to the carbohydrate syrup. These modifications as well as others may be made to the present invention. Accordingly, the present invention is not limited to the preferred embodiments previously described but should be only limited by the appended claims.

Accordingly having described my invention, I claim:

1. A method of forming a non-acid resistant salt and beer stable ammonia caramel color by reacting a carbohydrate syrup containing water and carbohydrates with an ammonia catalyst, selected from the group consisting of ammonia and aqueous ammonia said method comprising:

adding said ammonia catalyst to said carbohydrate syrup to form a mixture of said carbohydrate syrup and ammonia catalyst, said carbohydrate syrup having a dextrose equivalent of from about 75 to about 95;

subjecting said mixture to an effective temperature and pressure for an effective time to cause caramelization of said carbohydrates wherein said effective temperature is from about 230° F. to about 330° F. and said effective pressure is from about 15 to about 100 psi to establish a final color formation greater than 0.1 absorbance at 610 nm at 0.1% w/v through a 10 mm cell;

establishing the water content of said mixture at up to no more than about 40% before said mixture develops a color of about 60% of said final color formation.

2. The method claimed in claim 1 wherein said time is from about 10 minutes to about 200 minutes.

3. The method claimed in claim 1 wherein said carbohydrate syrup has a solids content of at least about 80%.

4. The method claimed in claim 1 wherein said final color formation is from about 0.15 to about 2.0 absorbance at 610 nm at 0.1% w/v through a 10 mm cell.

5. The method claimed in claim 4 wherein said final color formation is at least from about 0.17 to about 0.18 absorbance at 610 nm at 0.1% w/v through a 10 mm cell.

6. The method claimed in claim 1 wherein said ammonia catalyst is added to said syrup at a rate effective to maintain the pH of said mixture at less than about 6.5.

7. The method claimed in claim 1 further comprising preheating said syrup to at least about 230° F. prior to adding said catalyst to said syrup.

8. A method of forming a non-acid resistant salt and beer stable ammonia caramel color consisting of reacting a carbohydrate syrup containing water and carbohydrates with an ammonia catalyst, selected from the group consisting of ammonia and aqueous ammonia said method comprising:

adding said ammonia catalyst to said carbohydrate syrup to form a mixture of said carbohydrate syrup and ammonia catalyst, said carbohydrate syrup having a dextrose equivalent of from about 75 to about 95;

subjecting said mixture to an effective temperature and pressure for an effective time to cause caramelization of said carbohydrates wherein said effective temperature is from about 230° F. to about 330° F. and said effective pressure is from about 15 to about 100 psi to establish a final color formation greater than 0.1 absorbance at 610 nm at 0.1% w/v through a 10 mm cell;

establishing the water content of said mixture at up to no more than about 40% before said mixture develops a color of about 60% of said final color formation.

* * * * *